United States Patent
Sekido

(10) Patent No.: US 11,375,589 B2
(45) Date of Patent: Jun. 28, 2022

(54) LIGHTING CONTROL METHOD AND LIGHTING CONTROL DEVICE FOR SEMICONDUCTOR LIGHT EMITTING ELEMENT, LIGHT EMITTING DEVICE

(71) Applicant: STANLEY ELECTRIC CO., LTD., Tokyo (JP)

(72) Inventor: Keizo Sekido, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/081,030

(22) Filed: Oct. 27, 2020

(65) Prior Publication Data

US 2021/0144821 A1   May 13, 2021

(30) Foreign Application Priority Data

Nov. 12, 2019   (JP) .............................. JP2019-204818

(51) Int. Cl.
*H05B 45/14* (2020.01)
*H05B 45/345* (2020.01)
*G03B 15/05* (2021.01)

(52) U.S. Cl.
CPC ............ *H05B 45/14* (2020.01); *G03B 15/05* (2013.01); *H05B 45/345* (2020.01)

(58) Field of Classification Search
CPC ........ H05B 45/14; H05B 45/30; H05B 45/32; H05B 45/325; H05B 45/345; H05B 47/10; H05B 47/125; G03B 15/05
See application file for complete search history.

(56) References Cited

U.S. PATENT DOCUMENTS

| | | | |
|---|---|---|---|
| 10,499,469 B2 | 12/2019 | Sekido | |
| 2010/0327761 A1* | 12/2010 | Jin | H05B 41/2828 |
| | | | 315/219 |
| 2011/0133661 A1* | 6/2011 | Ren | H05B 45/10 |
| | | | 315/209 R |
| 2016/0351132 A1* | 12/2016 | Joo | H05B 45/38 |
| 2017/0257916 A1* | 9/2017 | Sumitani | H05B 45/37 |
| 2021/0076465 A1* | 3/2021 | Aoki | H05B 45/14 |
| 2021/0144821 A1* | 5/2021 | Sekido | H05B 45/345 |

FOREIGN PATENT DOCUMENTS

JP        2019144468 A        8/2019

* cited by examiner

*Primary Examiner* — Abdullah A Riyami
*Assistant Examiner* — Syed M Kaiser
(74) *Attorney, Agent, or Firm* — Holtz, Holtz & Volek PC

(57) ABSTRACT

To reduce the time until the start of the lighting while suppressing the overshoot of the current. A method to carry out lighting control of a semiconductor light emitting element using a lighting control device where the lighting control device includes a switching element serially connected to the semiconductor light emitting element and having a control terminal to control a conductive state, and a control circuit to control the control terminal. The method including: increasing a control voltage of the control terminal of the switching element from an initial value to a first value in a relatively short time by the control circuit; and increasing the control voltage of the control terminal of the switching element from the first value to a second value in a relatively long time by the control circuit.

12 Claims, 7 Drawing Sheets

LIGHTING CONTROL METHOD AND LIGHTING CONTROL DEVICE FOR SEMICONDUCTOR LIGHT EMITTING ELEMENT, LIGHT EMITTING DEVICE

BACKGROUND

Technical Field

The present disclosure relates to a lighting control technique for a semiconductor light emitting device such as an LED (Light Emitting Diode).

Description of the Background Art

There is known a stroboscopic device using an LED to illuminate a subject when photographing with a camera, for example. A prior art of such an LED stroboscopic device is described in Japanese Unexamined Patent Application Publication No. 2019-144468, for example. In such a stroboscopic device, for example, an FET (field effect transistor) is connected in series with an LED and a drive voltage is applied thereto, and by the gradual increase of a gate voltage of the FET to create a conductive state between the source and drain, a current flows through the LED. Then, the current flowing through the LED (hereinafter referred to as "LED current") is detected, and when the LED current reaches a predetermined value, the increase of the gate voltage of the FET is stopped and the gate voltage is maintained. As a result, the LED can be lit with a constant current.

Incidentally, in the stroboscopic device as described above, in order to shorten the time required to start the lighting of the LED, one solution may be is to increase the gate voltage of the FET at a faster rate. However, in this case, due to a time lag from the detection of the LED current by the control unit till the stoppage of the increase of the gate voltage, a phenomenon (so-called an overshoot) occurs in which an excessively large LED current is temporarily generated.

Whereas, if the increase of the gate voltage of the FET is moderated, then the occurrence of the overshoot can be prevented. However, in this case, the time required to start the lighting of the LED will be longer. As a result, the stroboscopic device causes an emission delay of the irradiation light, which is not preferable. Such a problem exists not only in a stroboscopic device but also in a light emitting device in general.

In a specific aspect, in a light emitting device using a semiconductor light emitting element such as an LED, it is an object of the present disclosure to provide a lighting control technique capable of reducing the time until the start of lighting while suppressing the overshoot of the current.

SUMMARY

[1] A lighting control method according to one aspect of the present disclosure is a method to carry out lighting control of a semiconductor light emitting element using a lighting control device, where the lighting control device includes: a switching element serially connected to the semiconductor light emitting element and having a control terminal to control a conductive state; a control circuit to control the control terminal; and the method including: increasing a control voltage of the control terminal of the switching element from an initial value to a first value in a relatively short time by the control circuit; and increasing the control voltage of the control terminal of the switching element from the first value to a second value in a relatively long time by the control circuit.

[2] A lighting control device according to one aspect of the present disclosure is a device to carry out lighting control of a semiconductor light emitting element by controlling the current flowing through the semiconductor light emitting element including: (a) a switching element serially connected to the semiconductor light emitting element and having a control terminal to control a conductive state; (b) a control circuit to control the control terminal; and (c) where the control circuit increases a control voltage of the control terminal of the switching element from an initial value to a first value in a relatively short time, and increases the control voltage of the control terminal of the switching element from the first value to a second value in a relatively long time.

[3] A light emitting device according to one aspect of the present disclosure is a light emitting device including the lighting control device described above and a semiconductor light emitting element whose lighting is controlled by the lighting control device.

According to the configurations described above, in a light emitting device using a semiconductor light emitting element such as an LED, it is possible to reduce the time until the start of the lighting while suppressing the overshoot of the current.

DESCRIPTION OF THE PREFERRED EMBODIMENTS

First Embodiment

Figure 1:
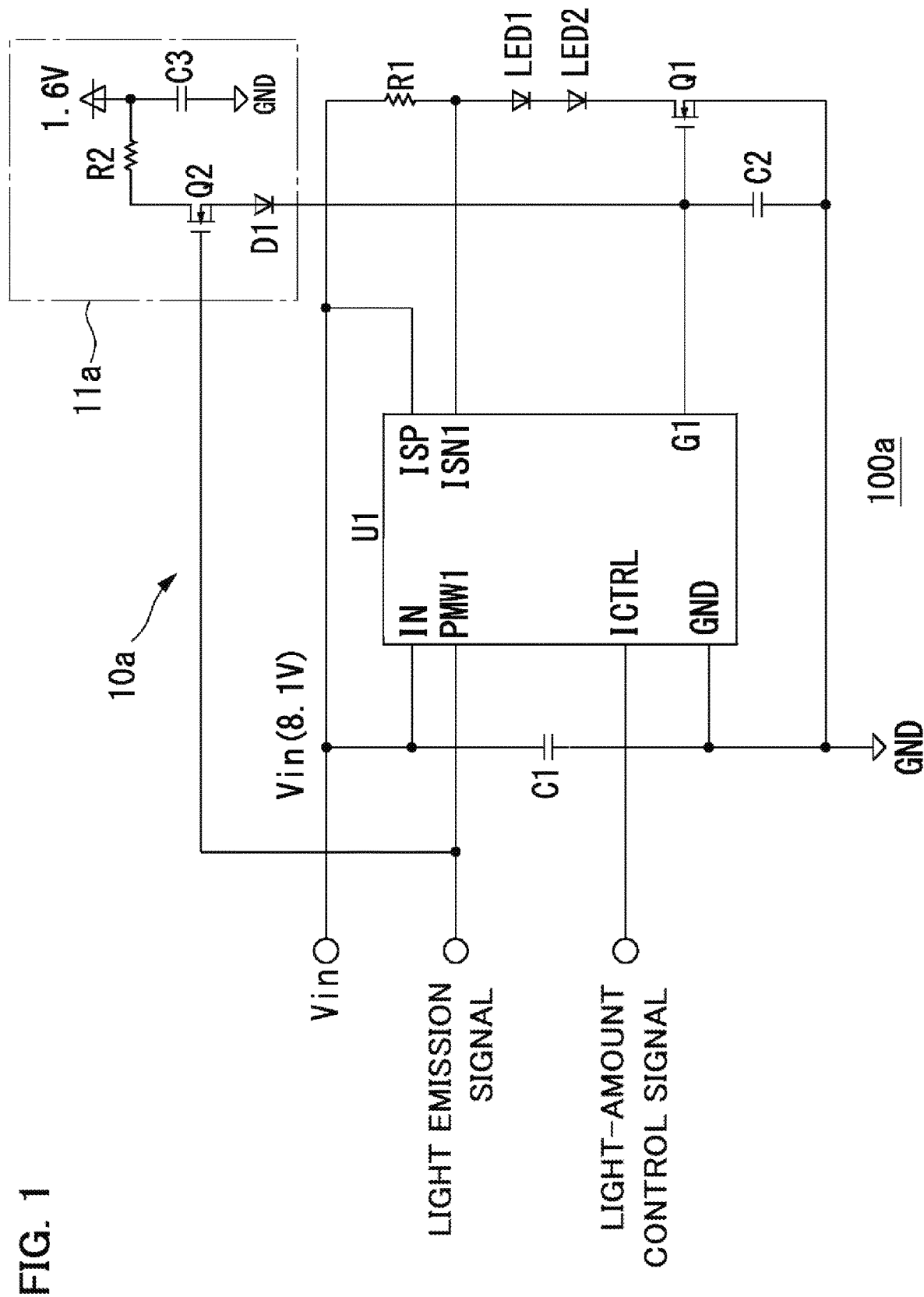
FIG. 1 is a circuit diagram showing the configuration of a stroboscopic device according to the first embodiment.

FIG. 1 is a circuit diagram showing the configuration of a stroboscopic device according to the first embodiment. The stroboscopic device 100a of the present embodiment is configured to include a lighting control device 10a and LEDs 1 and 2 whose lighting is controlled by the lighting control device 10a. The stroboscopic device 100a is used by being installed in a camera, for example, and operates by being supplied with a voltage $V_{in}$ from a power supply circuit (not shown), and when the stroboscopic device 100a receives a light emission signal from a control unit of the camera (not shown), flash light is generated by driving the LEDs 1 and 2. The light quantity of the flash light is set according to the light-amount control signal provided from the control unit of the camera.

Here, although the two LEDs 1 and 2 connected in series are used in the illustrated example, the number of LEDs is not limited to two and can be arbitrarily increased or decreased. Further, some LEDs may be connected in parallel, or may be connected in series and parallel.

The lighting control device 10a is configured to include a control unit U1, capacitors (capacitance elements) C1, C2, C3, resistance elements R1, R2, a diode D1, and field effect transistors Q1, Q2. Here, the field effect transistor Q1 corresponds to the "switching element" of the present disclosure, and the configuration other than the transistor corresponds to the "control circuit" of the present disclosure (the same applies to the second and third embodiments).

The control unit (controller) U1 is configured by using, for example, a microcomputer, and controls the overall operation of the lighting control device 10a. The control unit U1 operates by receiving the voltage $V_{in}$ supplied from the power supply circuit through the terminal IN and the terminal GND. Further, the control unit U1 receives the light emission signal through the terminal PWM1 and receives the light-amount control signal through the terminal ICTRL. In addition, the control unit U1 detects the current at the terminals ISP and ISN1. The control unit U1 also supplies a control voltage from the terminal G1 to the gate of the field effect transistor Q1. Here, as such a control unit U1, for example, a known device (controller) specified by model number TPS92830-Q1 manufactured by Texas Instruments Inc. can be used.

The resistance element R1 is connected in series to the LEDs 1 and 2. Specifically, the resistance element R1 has one end connected to the supply terminal of the voltage $V_{in}$ and the other end connected to the anode of the LED1. The resistance element R1 has one end connected to the terminal ISP of the control unit U1 and the other end connected to the terminal ISN1 and is used for current detection of the control unit U1. The current detected here corresponds to the current flowing through the LEDs 1 and 2. The resistance value of the resistance element R1 is, for example, 0.1Ω.

The field effect transistor Q1 has its current path (source-drain region) connected in series to the LEDs 1 and 2, and its gate (control terminal) connected to the terminal G1 of the control unit U1. Specifically, the current path of the field effect transistor Q1 has one end connected to the cathode of the LED2 and the other end connected to the GND terminal (reference potential terminal).

The field effect transistor Q2 has one end of its current path connected to a 1.6 V power source via the resistance element R2, the other end connected to the gate of the field effect transistor Q1 via the diode D1, and its gate connected to the input terminal of the light emission signal.

The diode D1 has its anode connected to the current path of the field effect transistor Q2 and its cathode connected to the gate of the field effect transistor Q1. The resistor element R2 has one end connected to the current path of the field effect transistor Q2 and the other end connected to the 1.6V power source.

The capacitor C1 is connected between the terminal IN and the terminal GND of the control unit U1. The capacitor C2 has one end connected to the terminal G1 of the control unit U1 and the gate of the field effect transistor Q1, and the other end connected to the GND terminal. The capacitor C3 has one end connected to the 1.6V power source, and the other end connected to the GND terminal. For example, the capacitance value of the capacitor C1 is 100 µF, the capacitance value of the capacitor C2 is 0.013 µF, and the capacitance value of the capacitor C3 is 0.1 µF.

A voltage adding circuit 11a is constituted by including the field effect transistor Q2, the resistance element R2, the capacitor C3, and the diode D1 described above. The voltage adding circuit 11a is a circuit to further add voltage to the gate of the field effect transistor Q1 with respect to the voltage supplied from the control unit U1.

Figure 2A:
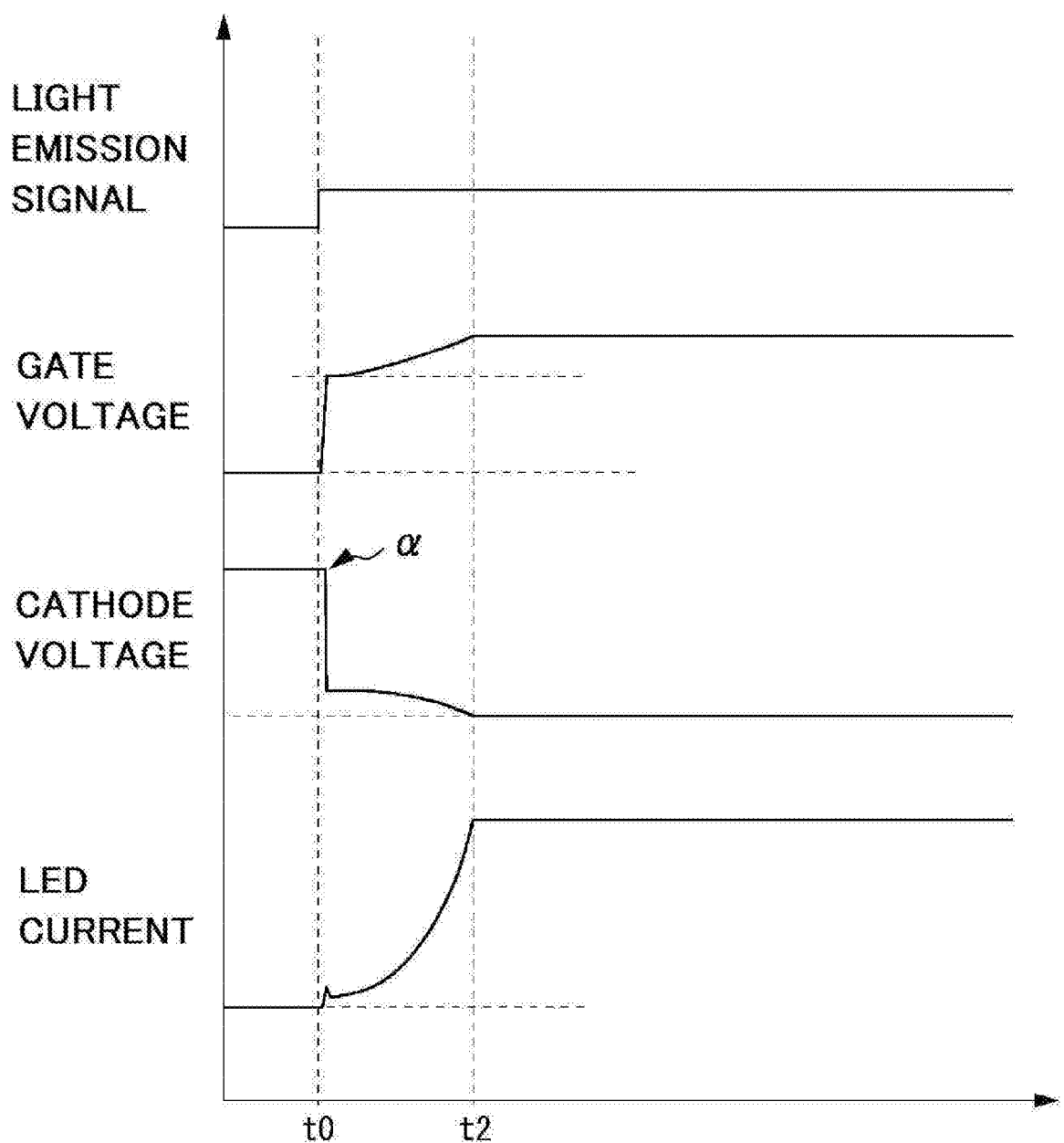
FIG. 2A is a timing chart to explain the operation of the lighting control device.
Figure 2B:
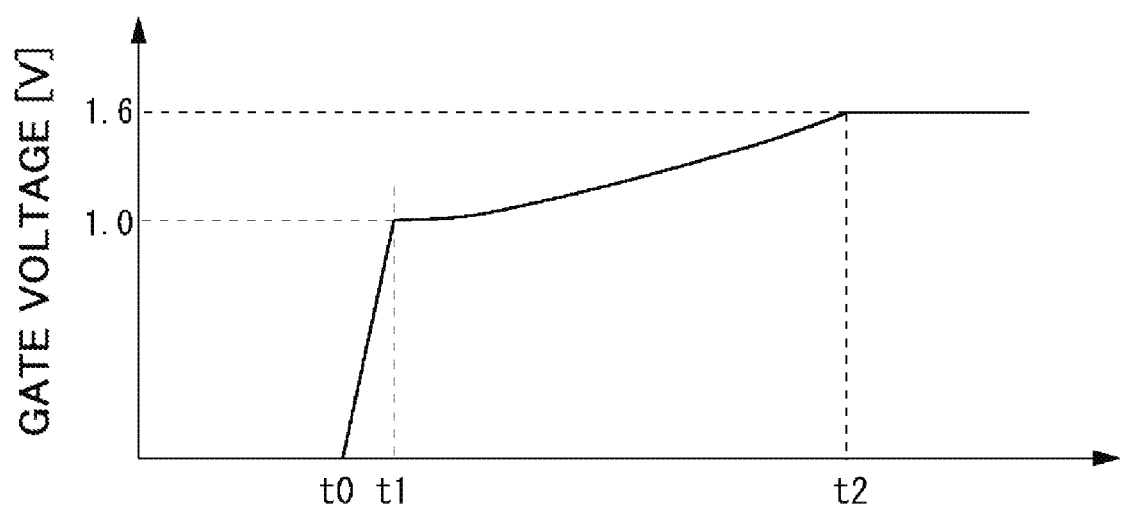
FIG. 2B is a partially enlarged view of the waveform of the gate voltage shown in FIG. 2A.
Figure 3:
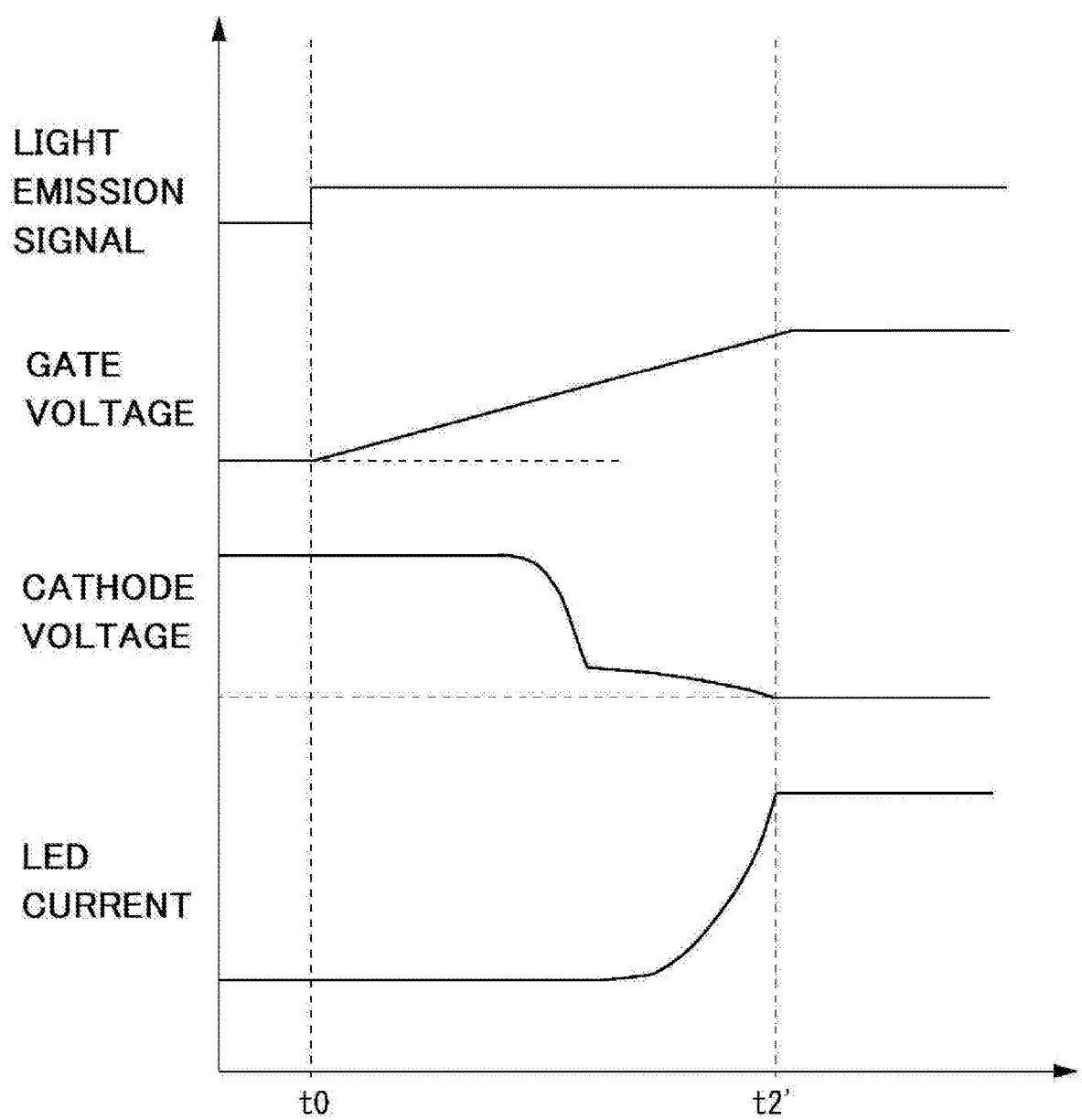
FIG. 3 is a timing chart to explain the operation of the lighting control device of a reference example.

Next, the operation of the lighting control device 10a will be described with reference to the timing charts shown in FIGS. 2A and 3. FIG. 2A is a timing chart of the lighting control device 10a of the present embodiment, and FIG. 3 is a timing chart of the lighting control device of a reference example. Further, FIG. 2B is a partially enlarged view of the waveform of the gate voltage shown in FIG. 2A. Here, the lighting control device of the reference example is a lighting control device in which the voltage adding circuit 11a including the field effect transistor Q2, the resistance element R2, the capacitor C3, and the diode D1 is omitted from the lighting control device 10a shown in FIG. 1. In FIGS. 2A and 3, the waveform of the light emission signal is shown in the first row, the waveform of the gate voltage of the field effect transistor Q1 is shown in the second row, the waveform of the cathode voltage of LED2 is shown in the third row, and the waveform of the current flowing into LEDs 1 and 2 (LED current) is shown in the fourth row.

First, the overall operation will be described. When the light emission signal changes from a low level to a high level (light emission instruction) at the terminal PWM1 of the control unit U1, a current (for example, 0.3 mA) flows from the terminal G1 of the control unit U1, thereby the capacitor C2 is charged and the gate voltage of the field effect transistor Q1 increases. When the gate voltage exceeds a threshold value, the current path of the field effect transistor Q1 becomes conductive and current flows through the LEDs 1 and 2. This current also flows through the resistance element R1, and the current is detected by the terminals ISP and ISN1 of the control unit U1. That is, the control unit U1 functions as a current detection unit. The control unit U1 controls the current flowing from the terminal G1 so that the voltage obtained between the terminals ISP and ISN1 by the current detection and the voltage of the light-amount control signal provided to the ICTRL has a certain relationship (for example, 5 time of the voltage between the terminals ISP and ISN1 being equal to the voltage of the light-amount control signal). As a result, the LEDs 1 and 2 can be turned on with a current having a desired magnitude.

Here, the time required for the current flowing through the LEDs 1 and 2 to reach a desired magnitude after the light emission signal changes to the high level is basically determined by the current from the terminal G1 of the control unit U1, the capacitance of the capacitor C2, and the gate-source junction capacitance of the field effect transistor Q1. In the lighting control device of the reference example, for example, if the gate voltage when a desired current flows through the LEDs 1 and 2 is 1.6 V and the capacitance of the capacitor C2 is 0.013 µF, then the time (time from time t0 to time t2' shown in FIG. 3) required for the current to flow through the LEDs 1 and 2 to reach a desired magnitude (for example, 1.8 A) is approximately 70 µs.

Whereas in the lighting control device 10a of the present embodiment, when the light emission signal becomes the high level, the field effect transistor Q2 becomes conductive accordingly, and a voltage is applied to the gate of the field effect transistor Q1 from the 1.6V power source through the resistance element R2 and the diode D1. The applied voltage here is 1.0 V obtained by subtracting the forward voltage drop Vf (for example, 0.6 V) of the diode D1.

Since the voltage provided by the voltage adding circuit 11a which is constituted by the field effect transistor Q2, the diode D1, the resistance element R2, etc. drastically increases, as shown in the enlarged view of FIG. 2B, the gate voltage of the field effect transistor Q1 also drastically increases in a relatively short time (from time t0 to time t1) from 0V (initial value) to 1.0V (first value). Then, from time t1 to time t2, the gate voltage of the field effect transistor Q1 gradually increases from 1.0 V to 1.6V (second value) by the current from the terminal G1 of the control unit U1 in a relatively long time (from time t1 to time t2). This gate voltage is maintained after the gate voltage increases to 1.6 V (at or after time t2).

By controlling the gate voltage of the field effect transistor Q1 as described above, if the condition remains the same as the above described reference example, then the time (from time t0 to time t2 shown in FIG. 2A) required for the current to flow through the LEDs 1 and 2 to reach the desired magnitude is shortened to approximately 20 µs. Further, since the gate voltage is increased in two steps, it is possible to suppress overshoot, which is a phenomenon in which the current flowing through the LEDs 1 and 2 greatly exceeds a desired magnitude.

Here, in the above description, 1.0 V is exemplified as the first value of the gate voltage and 1.6 V is exemplified as the second value. However, in consideration of individual differences among the field effect transistors Q1 or temperature change, etc., the first value of the gate voltage is preferably set to 50% or more and 70% or less of the second value. From another perspective, it is preferable that the first value of the gate voltage is set so that the magnitude of the current flowing through LEDs 1 and 2 corresponding to the first value becomes 0.1% or more and 10% or less of the magnitude of the current flowing through LEDs 1 and 2 corresponding to the second value.

Second Embodiment

Figure 4:
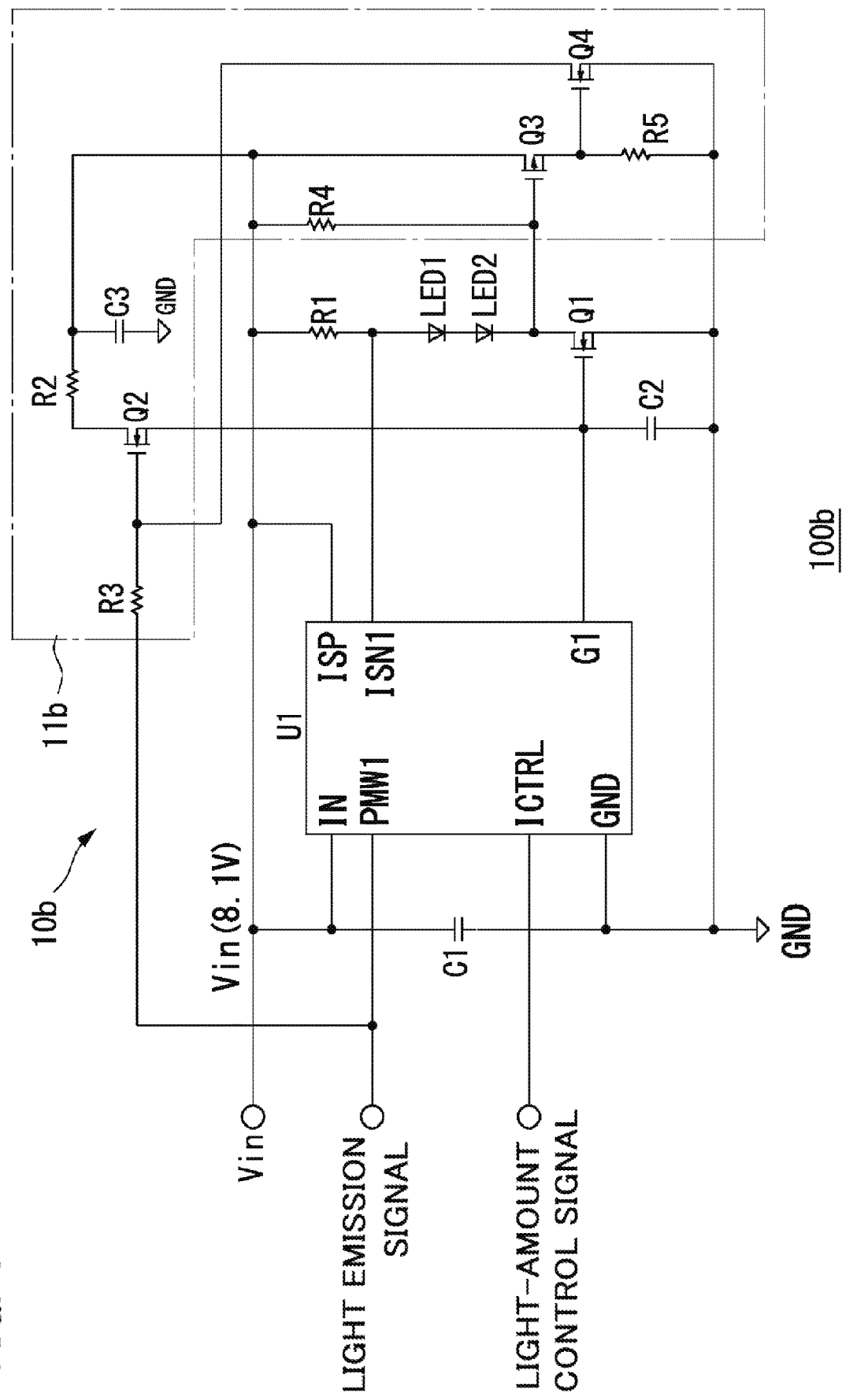
FIG. 4 is a circuit diagram showing the configuration of a stroboscopic device according to the second embodiment.

FIG. 4 is a circuit diagram showing the configuration of a stroboscopic device according to the second embodiment. The stroboscopic device 100b of the present embodiment has the same basic configuration as that of the stroboscopic device 100a of the first embodiment described above. The configuration of the voltage adding circuit 11b in the lighting control device 10b is different from that of the voltage addition circuit 11a in the first embodiment. Hereinafter, description of portions which overlaps with the first embodiment will be omitted, and changed portions will be mainly described.

The voltage adding circuit 11b is configured to include field effect transistors Q2, Q3, Q4, resistance elements R2, R3, R4, R5, and a capacitor C3. The field effect transistor Q2, the resistance element R2, and the capacitor C3 are connected in a similar state as in the case of the first embodiment. However, a 1.6V power supply is not provided on one end side of each of the resistance element R2 and the capacitor C3.

The resistance element R3 is connected between the input terminal of the light emission signal and the gate of the field effect transistor Q2. With regard to the field effect transistor Q3, its gate is connected between the cathode of the LED2 and the field effect transistor Q1, one end of its current path is connected to the supply terminal of the voltage $V_{in}$, and the other end is connected to the GND terminal via the resistance element R5. With regard to the field effect transistor Q4, its gate is connected between the current path of the field effect transistor Q3 and the resistance element R5, one end of its current path is connected to the gate of the field effect transistor Q2, and the other end is connected to the GND terminal.

Next, the operation of the lighting control device 10b will be described with reference to the timing chart shown in FIG. 2A. Since the overall operation of the lighting control device 10b is the same as that of the lighting control device 10a in the first embodiment, differences will be mainly described here.

In the lighting control device 10b of the present embodiment, when the light emission signal becomes the high level, the field effect transistor Q2 becomes conductive accordingly. As a result, a voltage is applied to the gate of the field effect transistor Q1.

When the gate voltage of the field effect transistor Q1 reaches a threshold value, the current path of the field effect transistor Q1 becomes conductive. As a result, since the cathode voltage of LED2 drops (refer to point a of the waveform shown in the third row of FIG. 2A), this is detected by the field effect transistor Q3. Specifically, each of the field effect transistors Q3 and Q4 is turned on and each current path is conducted. As a result, the gate of the field effect transistor Q2 is connected to the GND terminal, the field effect transistor Q2 becomes a turned-off state, and voltage application to the gate of the field effect transistor Q1 is stopped.

Thereafter, the gate voltage of the field effect transistor Q1 gradually increases to 1.6V by the current from the terminal G1 of the control unit U1. After the gate voltage increases to 1.6 V (at or after time t2), this gate voltage is maintained.

As described above, the lighting control device 10b according to the second embodiment can also reduce the time until the start of lighting while suppressing the overshoot of the current flowing through the LEDs 1 and 2.

Third Embodiment

Figure 5:
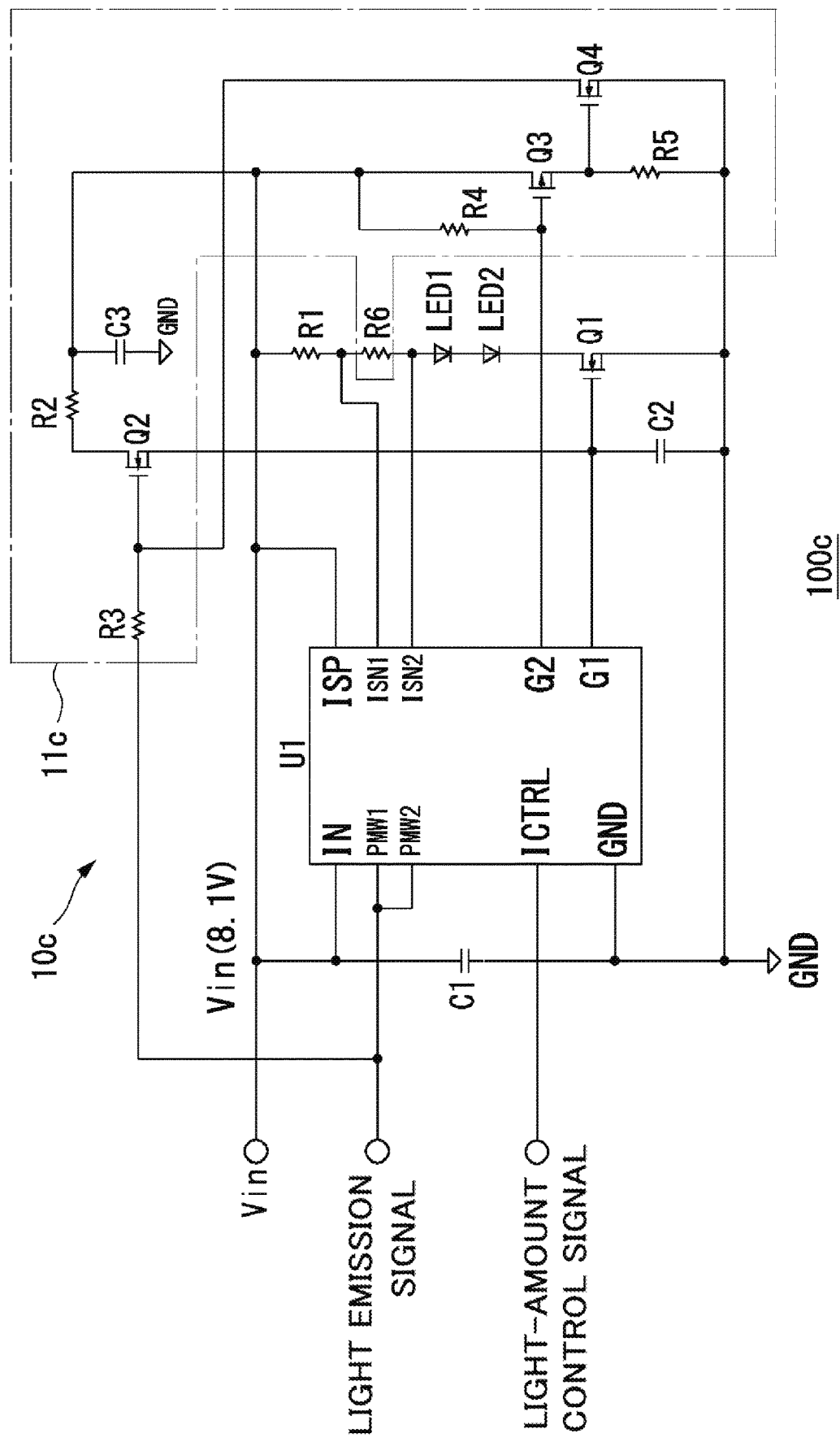
FIG. 5 is a circuit diagram showing the configuration of a stroboscopic device according to the third embodiment.

FIG. 5 is a circuit diagram showing the configuration of a stroboscopic device according to the third embodiment. The stroboscopic device 100c of the present embodiment has the same basic configuration as that of the stroboscopic device 100b of the second embodiment described above. The configuration of the voltage adding circuit 11c in the lighting control device 10c is different from that of the voltage addition circuit 11b in the second embodiment. Hereinafter, description of portions which overlaps with the second embodiment will be omitted, and changed portions will be mainly described.

The voltage adding circuit 11c is configured to include field effect transistors Q2, Q3, Q4, resistance elements R2, R3, R4, R5, R6, and a capacitor C3. The difference from the configuration of the second embodiment is that a resistance element R6 is added and the gate of the field effect transistor Q3 is connected to the terminal G2 of the control unit U1. The resistance element R6 is connected between the resistance element R1 and the LED1. The control unit U1 detects both-end voltage of the resistor element R1 disposed between the terminal ISP and the terminal ISN1 and detects both-end voltage of the resistor element (R1+R6) disposed between the terminal ISP and the terminal ISN2, thereby detects the current flowing through the LEDs 1 and 2. That is, the control unit U1 functions as a current detection unit.

Figure 6:
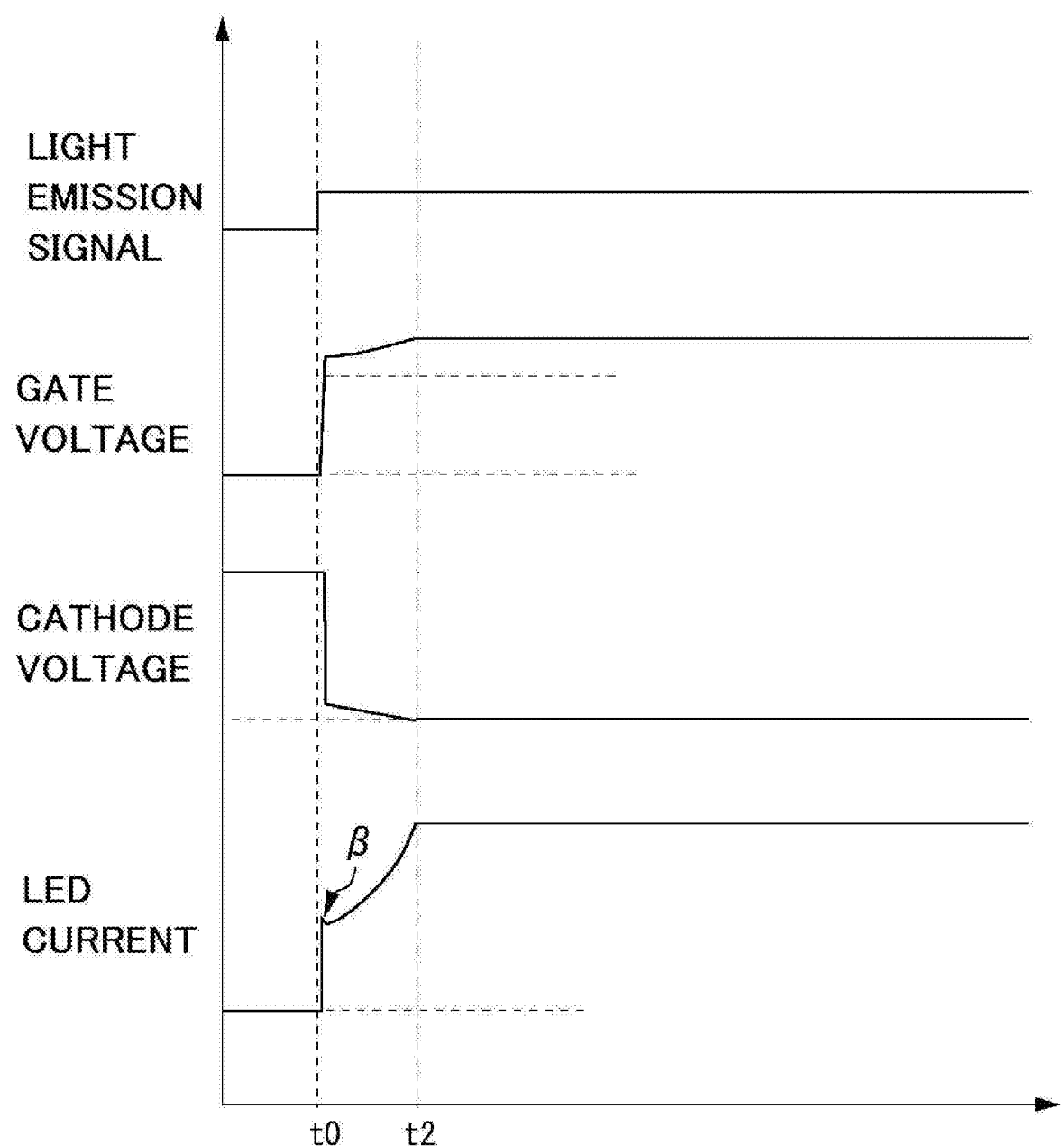
FIG. 6 is a timing chart to explain the operation of the lighting control device.

Next, the operation of the lighting control device 10c will be described with reference to the timing chart shown in FIG. 6. The overall operation of the lighting control device 10c is similar to that of the lighting control device 10a of the first embodiment and the lighting control device 10b of the second embodiment, and therefore the differences will mainly be described here.

In the lighting control device 10c of the present embodiment, when the light emission signal becomes the high level, the field effect transistor Q2 becomes conductive accordingly. As a result, a voltage is provided to the gate of the field effect transistor Q1. Here, since the resistance elements R1 and R6 are connected in series, for example, assuming that these two have the same resistance value, when the current flowing through LEDs 1 and 2 becomes ½ of a desired magnitude (refer to point R in the fourth waveform from the top in FIG. 6), the control unit U1 detects it by the terminal ISP-ISN2, and since the terminal G2 operates so as to absorb the current, the gate voltage of the field effect transistor Q3 becomes a GND level (reference potential). As a result, the field effect transistors Q3 and Q4 become turned-on state, the field effect transistor Q2 is turned off, and voltage application to the gate of the field effect transistor Q1 is stopped.

Thereafter, the gate voltage of the field effect transistor Q1 gradually increases to 1.6 V by the current from the terminal G1 of the control unit U1. After the gate voltage increases to 1.6 V (at or after time t2), this gate voltage is maintained.

As described above, the lighting control device 10c according to the third embodiment can also reduce the time until the lighting starts while suppressing the overshoot of the current flowing through the LEDs 1 and 2.

Here, in the third embodiment, the control unit U1 detects the current flowing through the LEDs 1 and 2 when the current becomes ½ (a detection reference) of the desired magnitude. Note that the magnitude of the current which becomes the detection reference is preferably adjusted within the range of 30% or more and 70% or less of the desired magnitude. This can be adjusted by changing the resistance values of the resistance elements R1 and R6.

It should be noted that the present disclosure is not limited to the subject matter of the foregoing embodiments, and can be implemented by being variously modified within the scope of the present disclosure as defined by the appended claims. For example, although LEDs are used as an example of the semiconductor light emitting element in each embodiment, the semiconductor light emitting element is not limited thereto, and a semiconductor light emitting element such as a semiconductor laser (LD) may also be used. Similarly, although a field effect transistor is used as an example of a switching element in each embodiment, the switching element is not limited thereto.

Further, the circuit configuration in each embodiment is merely an example, and the circuit configuration can be suitably modified and implemented as long as a desired operation can be achieved. That is, other elements and the like not shown in each embodiment may be further added, or the circuit configuration may be different as long as similar lighting control method can be achieved.

Further, the scope of application of the lighting control device and the lighting control method according to the present disclosure is not limited to a stroboscopic device and can be applied to a general light emitting device that is expected to generate high light intensity in a relatively short time.

The present application claims priority based on Japanese Patent Application No. 2019-204818 filed on Nov. 12, 2019. The entire disclosure of Japanese Patent Application No. 2019-204818 filed on Nov. 12, 2019, which includes the specification, claims, drawings and abstract, is incorporated herein by reference in its entirety.

What is claimed is:

1. A lighting control method of a semiconductor light emitting element to carry out lighting control of the semiconductor light emitting element using a lighting control device, the lighting control device comprising (i) a switching element serially connected to the semiconductor light emitting element and having a control terminal to control a conductive state, and (ii) a control circuit to control the control terminal, and the lighting control method comprising:

a first step which increases a control voltage of the control terminal of the switching element from an initial value to a first value in a first time period by the control circuit; and a second step which increases the control voltage of the control terminal of the switching element from the first value to a second value in a second time period by the control circuit, the second time period being longer than the first time period, wherein:

in the first step, the control circuit increases the control voltage of the control terminal from the initial value while detecting a cathode voltage of the semiconductor light emitting element, and when the control circuit detects a decrease in the cathode voltage, the increase in the control voltage is stopped, and a magnitude of the control voltage at the time when the increase is stopped corresponds to the first value.

2. The lighting control method according to claim 1, wherein the first value of the control voltage is at least 50% and at most 70% of the second value.

3. The lighting control method according to claim 1, wherein the first value of the control voltage is set so that a magnitude of a current flowing through the semiconductor light emitting element corresponding to the first value becomes at least 0.1% and at most 10% of a magnitude of a current flowing through the semiconductor light emitting element corresponding to the second value.

4. A lighting control method of a semiconductor light emitting element to carry out lighting control of the semiconductor light emitting element using a lighting control device, the lighting control device comprising (i) a switching element serially connected to the semiconductor light emitting element and having a control terminal to control a conductive state, and (ii) a control circuit to control the control terminal, and the lighting control method comprising:

a first step which increases a control voltage of the control terminal of the switching element from an initial value to a first value in a first time period by the control circuit; and a second step which increases the control voltage of the control terminal of the switching element from the first value to a second value in a second time period by the control circuit, the second time period being longer than the first time period, wherein:

in the first step, the control circuit increases the control voltage of the control terminal from the initial value while detecting a current flowing through the semiconductor light emitting element, and when the control circuit detects that the current becomes at least 30% and at most 70% of the current corresponding to the second value, the increase in the control voltage is stopped, and a magnitude of the control voltage at the time when the increase is stopped corresponds to the first value.

5. A lighting control device of a semiconductor light emitting element to carry out lighting control of the semiconductor light emitting element, the lighting control device comprising:

a switching element serially connected to the semiconductor light emitting element and having a control terminal to control a conductive state; and a control circuit to control the control terminal, wherein:

the control circuit increases a control voltage of the control terminal of the switching element from an initial value to a first value in a first time period, and increases the control voltage of the control terminal of the switching element from the first value to a second value in a second time period longer than the first time period, the control circuit has a voltage detection unit that detects a cathode voltage of the semiconductor light emitting element, increases the control voltage of the control terminal from the initial value while detecting the cathode voltage by the voltage detection unit, and stops the increase of the control voltage when the voltage detection unit detects a drop in the cathode voltage, and a magnitude of the control voltage at the time when the increase is stopped corresponds to the first value.

6. The lighting control device according to claim 5, wherein a magnitude of the first value of the control voltage is at least 50% and at most 70% of a magnitude of the second value.

7. The lighting control device according to claim 5, wherein the first value of the control voltage is set so that a magnitude of a current flowing through the semiconductor light emitting element corresponding to the first value becomes at least 0.1% and at most 10% of a magnitude of a current flowing through the semiconductor light emitting element corresponding to the second value.

8. A lighting control device of a semiconductor light emitting element to carry out lighting control of the semiconductor light emitting element, the lighting control device comprising:

a switching element serially connected to the semiconductor light emitting element and having a control terminal to control a conductive state; and a control circuit to control the control terminal, wherein:

the control circuit increases a control voltage of the control terminal of the switching element from an initial value to a first value in a first time period, and increases the control voltage of the control terminal of the switching element from the first value to a second value in a second time period longer than the first time period, the control circuit has a current detection unit that detects a current flowing through the semiconductor light emitting element, increases the control voltage of the control terminal from the initial value while detecting the current flowing through the semiconductor light emitting element by the current detection unit, and stops the increase of the control voltage when the current detection unit detects that the current has become at least 30% and at most 70% of the current corresponding to the second value, and a magnitude of the control voltage at the time when the increase is stopped corresponds to the first value.

9. A light emitting device comprising the lighting control device according to claim 5 and the semiconductor light emitting element whose lighting is controlled by the lighting control device.

10. A light emitting device comprising the lighting control device according to claim 8 and the semiconductor light emitting element whose lighting is controlled by the lighting control device.

11. The light emitting device according to claim 9, wherein the semiconductor light emitting element comprises an LED.

12. The light emitting device according to claim 10, wherein the semiconductor light emitting element comprises an LED.

* * * * *